Jan. 28, 1969 E. M. JONES 3,425,052

NON-LINEAR CODE MEMBER

Filed May 16, 1957

Inventor:
Edward M. Jones
By Graf, Nierman & Burmeister
Attorneys

United States Patent Office 3,425,052
Patented Jan. 28, 1969

3,425,052

NON-LINEAR CODE MEMBER

Edward M. Jones, Cincinnati, Ohio, assignor to D. H. Baldwin Company, Cincinnati, Ohio, a corporation of Ohio

Filed May 16, 1957, Ser. No. 659,717
U.S. Cl. 340—347 8 Claims
Int. Cl. H04l *3/00;* H03k *13/02*

This invention is related generally to encoding devices of the type wherein the displacement of an object from a nominal position in space is translated into electrical signals corresponding to digits in a binary number representative of such displacement. In particular my invention pertains to improvements in a code member of the type which enables translation of such displacement into a binary member corresponding to a *non-linear* function of such displacements.

The code member of this invention, if embodied in the form of a disk, may be employed in angular position encoders of the type described by Bernard Lippel in an article entitled, "A High-Precision Analog-to-Digital Converter," appearing in the Proceedings of the National Electronics Conference, vol. 7 (February 1952, pp. 206 to 215). Such devices employ code disks having thereon *linear* code patterns which measure the displacement of the disk from a nominal position by a binary number. It is also known in the art to provide disks with *non-linear* code patterns from which may be provided directly binary numbers corresponding to a trigonometric function of an angle of displacement of a shaft from a nominal position.

In the distribution of code patterns in a logical manner, as is the prior practice, to provide for non-linear codes such as would correspond to the sine of an angle, the code pattern will contain in its track corresponding to the *least-significant* digit, a fiducial mark or segment representing zero degrees (and also 180°, as the disk is symmetrical about the 90°–270° axis). In line with such marks is usually found a transition between a section of a concentric track on the disk corresponding to the *positive* sign of a trigonometric function and a portion corresponding to a *negative* sign. In the code representation, the least significant digit pattern is one quantum wide, and in the ideal disk the transition from positive to negative sign occurs exactly in the center. Consequently, as will be explained in detail hereinafter, not only will an error of as much as two quanta be produced if the sign-pattern transition is more than one-half quantum in error from its ideal position, but also, an ambiguity will exist. In code patterns distributed in accordance with the present invention, a half-quantum error is deliberately incorporated and will occur in the code read out, but since this error exists throughout the pattern, the number provided by a readout device may be made absolutely accurate by providing for the addition of ½ to all readings. Furthermore, a full *one*-quantum error in the disk of the present invention will produce only a one and one-half quanta error in the number read out. Further, as will be explained hereinafter, not only has it been necessary in the past to use a disk twice the size of the present invention for corresponding accuracy, but also an extra track in the pattern has been necessary to obtain one of the required digits.

Thus, it is a principal object of my invention to provide a half-previous-size, non-linear code member, which will in turn reduce by one half the size of a read-out device containing the code member, without sacrificing accuracy.

It is a further object of the present invention to provide a non-linear code member requiring one less code track than previously-known members.

It is a further object of my invention to provide a code member which can be produced by a simple system by means of which it is not possible to produce prior-art code members unless precise additional provisions are made.

These and other objects and advantages of the invention will be apparent during the course of the following description, when read in connection with the accompanying drawings; wherein.

Figure 1:
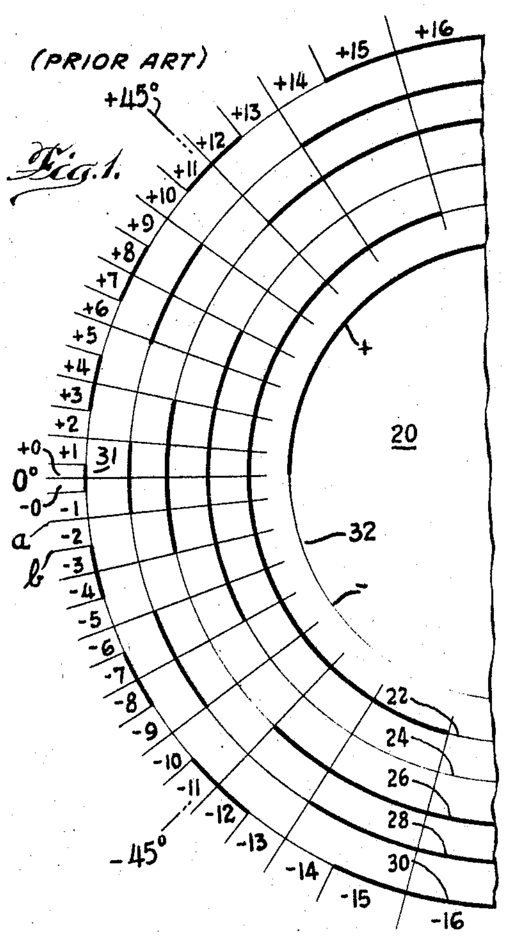
FIGURE 1 illustrates a portion of a code disk representative of the prior art.
Figure 2:
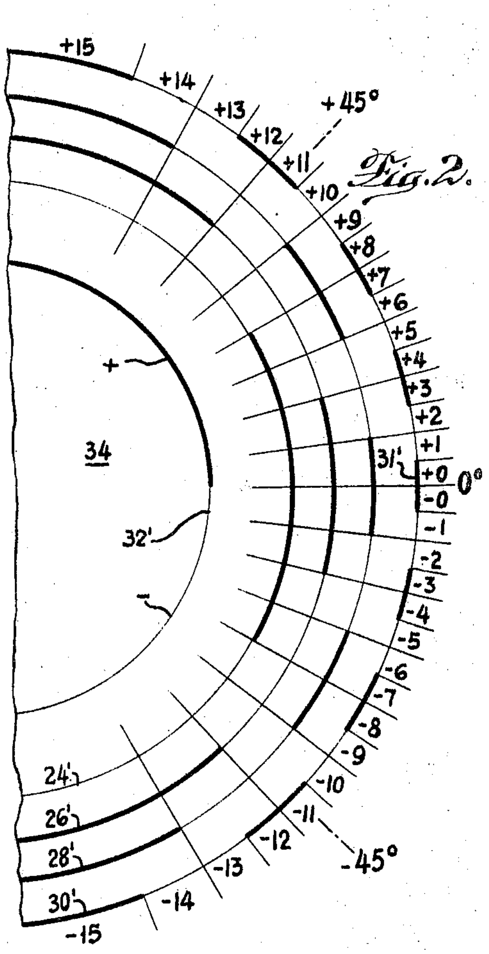
FIGURE 2 is an illustration of a corresponding part of a code disk incorporating the teachings of the present invention.
Figures 3A, 3B, 4A, 4B, 4C:
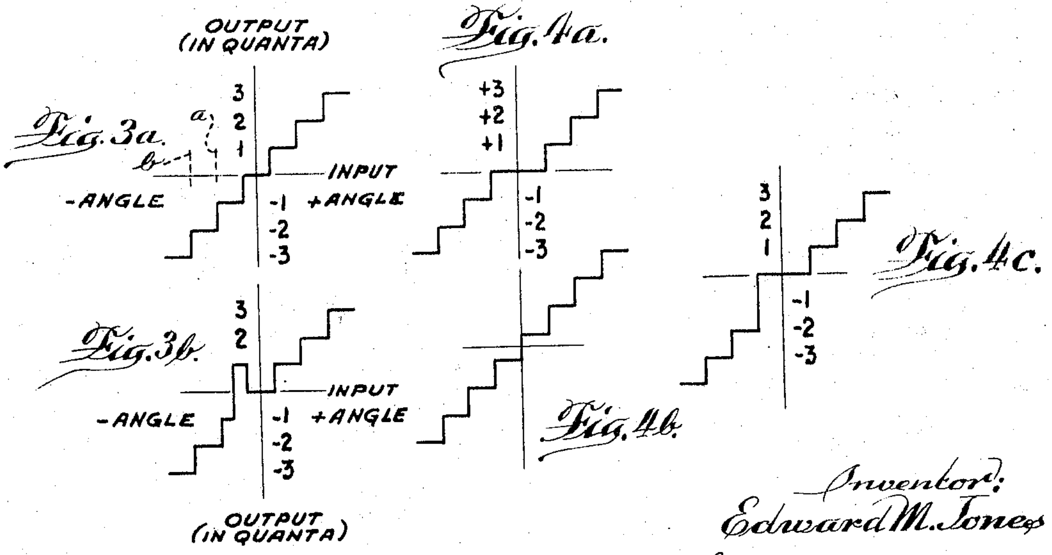

FIGURES 3*a* and 3*b* are graphs showing numbers which would be read out by the disk of FIGURE 1 under two different conditions;

FIGURES 4*a*, 4*b*, and 4*c* are graphs of numbers which would be read out by the disk of FIGURE 2 under three different conditions.

As is known in the art, a disk of the type, a portion of which is designated as 20 in FIGURE 1, is used together with an extremely narrow read-out slit, a light source and a group of photocells (not shown) to obtain a group of electrical signals corresponding to the angular position of the disk 20 about a shaft (not shown) at its center. For example, there may be one photocell for each of the circumferential tracks respectively designated as 22, 24, 26, 28 and 30. As is also known in the art, a series of transparent and opaque fiducial marks are alternately distributed circumferentially in each track. These marks are so arranged that as the disk is rotated from the zero degrees position, binary numbers corresponding to the sine of the angle of displacement are read out. In disk 20, for example, at the zero position, there are opaque marks in all the tracks from 22, 24, 26, 28 and 30. Thus, the number read out would be 00000, the right-hand digit, as is conventional, being the least-significant one. If, then, the disk is rotated until it reaches the center (with respect to a vertical axis) of the sector designated at +1, the binary number read out will be 00001. The next discrete position in the rotation of the disk would find the number 00011 read out in the sector designated as +2. Thus the cyclic binary numbers read out correspond to a sector or "quantum" distance which corresponds to a numerical fraction, such as $\frac{5}{16}$. It will be obvious that as the disk is rotated 90°, the binary number read out will correspond to $\frac{16}{16}$ or 1, which is the sine of 90°.

It will further be obvious to one skilled in the art that in the original laying out of the patterns on the disk 20, the boundaries of the fiducial marks in the track 30 are determined by the intersection of equally spaced horizontal lines with the track 30.

Reference is now made to FIGURE 3*a*, which illustrates the manner in which the number corresponding to the sine of the angle changes with the angular position of the shaft. This is a "step" function which progresses, as indicated in the graph, in a positive direction to the right of the vertical axis as a positive angle of displacement is increased. The same sort of a function is sene to occur as the angle is increased in the *negative* direction, so that, for example, for the angle between *a* and *b*, the sine will be read out as $-\frac{2}{16}$ or $-\frac{1}{8}$.

The distribution of the fiducial marks is of course symmetrical about the zero position, as the sine of the angle is equal in magnitude whether positive or negative with respect to zero degree position. Consequently, it is necessary, as known in the art, to provide an additional track 32, which may, if desired, be opaque for positive numbers and transparent for negative numbers, as illustrated in FIGURE 1.

Disks of the prior art type illustrated in FIGURE 1 have met service demands wherein the number of digits required is relatively low. In disks approaching the accuracies of the order of $2^{16}$, which may be produced by apparatus of the type disclosed in a co-pending application Ser. No. 512,032, filed May 31, 1955, in the name of Vernon E. Schmidt, entitled Code Generator, assigned to the same assignee, the quantum distance, such as that represented in the sector "+1'" in FIGURE 1, becomes of the same order of accuracy as the location of the boundary between the plus and minus segments of the sign track 32. If, for example, the boundary beween the (+) and (−) segments of the track is displaced downward slightly, so as to occur in a radial line corresponding to a position slightly below the "−0" sector, the number read out would be 00001, which is the correct *number* but the *sign* would be read out as *positive*. Therefore, an ambiguity would arise in which the *same* number would be read out for both the −1 and the +1 sectors of the disk.

Reference to FIGURE 3*b* is now made, wherein this ambiguity is shown graphically. This graph shows that there is an angular distance corresponding to 1½ quanta, not in a continuous segment wherein "+1" would be read out from the disk.

Thus in prior art disks, laid out in the logical manner, with each number represented on the disk by one quantum, there resides this possibility of larger than normal errors in the vicinity of "0" in high accuracy disks.

The basic concept of my invention lies in the deliberate introduction of a half-quantum error in the distribution of the patterns upon the code member, such as the disk illustrated in FIGURE 2. As will be explained in greater detail hereinafter, since this deliberately-introduced error exists around the entire disk, provision can be made easily in the read-out equipment for correcting this error. Thus the possible ambiguities due to slight errors in the pattern are removed, and disks of higher accuracy, for a given size, are achieved.

Referring now to the details of FIGURE 2, the disk of my invention is represented in part at 34, it not being necessary to illustrate the remainder, because of symmetry. The disk 34 has plus and minus segments in a track 32′ (corresponding elements in the disk of FIGURE 1 and FIGURE 2 have corresponding base numbers). Tracks corresponding to FIGURE 1 are illustrated at 24′, 26′, 28′ and 30′. These tracks represent from 24′ to 30′, respectively, the most-significant to least-significant digits of the number corresponding to the position of a disk from the zero position. The fiducial mark 31′ can be seen as being two quanta in length, whereas the prior art fiducial mark 31 (in FIGURE 1) is 1 quantum in length.

FIGURE 5 illustrates an encoder employing the present invention. The disc 34 is illustrated confronting a light source 36 which is diagrammatically illustrated as a lamp. A photocell 38 is disposed on the opposite side of the disc 34 confronting the track 32′, and in like manner, photocells 40, 42, 44, and 46 confront the tracks 24′, 26′, 28′, and 30′, respectively, on the side of the disc 34 opposite the light source 36. The photocells 40, 42, 44, and 46 are electrically connected to a means for adding one-half quantum designated 48, and it is the output of this means which is ideally illustrated in FIGURE 4B.

Referring now to FIGURE 4*a*, there is illustrated a graphical representation of the numbers which would be read out from the code pattern of FIGURE 2. It will be noted that both the positive and negative portions of the output are in error by a half quanta, which has been deliberately introduced as described above. However, if the read-out equipment makes provision for adding the half quanta error throughout the range, the read-out function is corrected as illustrated in 4*b*. Note that this function is similar to that in FIGURE 3*a*, which, ideally, is accurate.

Referring now to FIGURE 4*c*, there is illustrated the graph of the read-out with a *one* quantum error introduced, as in the case illustrated in FIGURE 3*b* for the prior art disk of FIGURE 1. Note that in FIGURE 4*c* there is no ambiguity and that an error up to one quantum in the sign track boundary introduces an error of only one quantum in the number read out (in addition to the ½ quanta error that is inherently present in the ideal response of FIG. 4*b*). Note that the error illustrated in FIGURE 3*b* can be as much as two quanta for an angular distance corresponding to the half quantaum, where the ambiguous positive reading occurs to the left of the vertical axis (FIGURE 3*b*). (Although it must be admitted that the absolute error does not exceed 2 quanta compared to 1½ quanta illustrated in 4*c*.)

As mentioned above, code disks according to my invention may be produced with equipment of the type disclosed in the above mentioned co-pending Schmidt application. As a matter of fact, a 3-digit code pattern of applicant's type is illustrated in FIGURE 1, as the group next to the innermost group. Such code patterns are readily made with the equipment described in this co-pending application. Also the apparatus disclosed in a co-pending application of the present inventor, Ser. No. 456,204, filed Sept. 15, 1954, entitled "Digital Pattern Producing Equipment," discloses in FIG. 1 a system which, if modified as illustrated in FIGURES 5 and 6, can be used to generate sine function code patterns in accordance with present invention. This is a very simple system, but if it were to be used to generate prior art code patterns, additional provisions such as precise reference pulse generating equipment would have to be added to produce prior art code disks.

Further modifications may be made in my invention without departing from the spirit of it. For example, rectilinear patterns or patterns distributed on the surfaces of cylinders may incorporate the teachings of my invention.

While for the purposes of illustrating and describing the present invention certain preferred embodiments have been illustrated in the drawings, it is to be understood that the invention is not to be limited thereby since such variations and additions are contemplated as may be commensurate with the spirit and scope of the invention set forth in the accompanying claims.

I claim as my invention:

1. In a code member of the type wherein a plurality of series of pattern areas are arranged for line readout of non-linear code numbers representative of displacements of said member from a nominal position, a series of areas in said plurality having at least one area which is bisected by the line readout at said nominal position and which extends one quantum distance in both directions from said nominal position, the remaining areas in said series being also two quanta in length, and at least two additional sign-determining areas whose boundary occurs at said nominal position.

2. In a binary code disk, a plurality of concentric series of code patterns corresponding at respective radial positions to binary numbers representative of the respective trigonometric functions of respective angles between said positions and a nominal position and including at least a pair of circumferentially-adjacent transparent and opaque patterns representative of the sign of said trigonometric functions, said pair of patterns being concentric with said plurality of series of patterns, the series of patterns in said plurality of patterns corresponding to the least-significant digit in said number having certain patterns, the respective centers of which are substantially co-radial with transition lines between said transparent and opaque patterns, said certain patterns being two quanta in length.

3. The disk of claim 2, wherein other series of patterns in said plurality of series contain patterns respectively 4, 8, 16 . . . quanta in length and having centers coradial with said transition lines between said opaque and transparent areas.

4. A sine-cosine code disk adapted for use in an optical encoder having means for rotatably mounting the code disk between a light source and a plurality of light responsive cells comprising means forming a plurality of coaxial tracks of transparent sectors separated by opaque sectors, the inner track being a single transparent sector joined by a single opaque sector of equal length for determining the sign of the encoder output, the transparent sectors of each of the tracks terminating at each end on a radius of the disk and only opaque sectors of the track being traversed by the radii terminating the sector of the inner track, and the transparent sectors of each inner track extending from the radius traversing a transparent sector of the next outer track on an axis in which the sign increment of the transparent sector is equally divided to the radius of the next longer transparent sector of the next outer track on an axis in which the next longer sign increment is equally divided, characterized by the improved construction wherein said radii are separated commencing at the ends of the inner track from each other by sinusoidally increasing angles throughout an arc of 90 degrees.

5. A code member adapted for photoelectric readout for encoding analog information into digital trigonometric functions comprising a disk adapted to rotate about its axis having a plurality of coaxial tracks of transparent and opaque sectors, the first of said tracks having at least one transparent sector and at least one opaque sector, the sectors of said first track being of equal length and said first track being adapted to determined the sign of the digitally encoded output from the disk, each of the transparent sectors of the other tracks of the disk terminating on radii of the disk forming a plurality of radial sectors of the disk, said disk having four quadrants and each radial sector in each quadrant containing a unique combination of transparent and opaque sectors, one end of each transparent sector of the first of said tracks being on a radius of the disk bisecting one of the radial sectors of the disk, and the radial sectors of the disk increasing in width in accordance with a trigonometric function on both sides of the bisector line commencing with the radial sector adjacent to said bisected sector, each half of said bisected sector having a width substantially equal to the width of the immediately adjacent radial sectors.

6. The method of encoding analog information into digital values corresponding to the trigonometric function of the analog information comprising the steps of driving a code disc having a plurality of coaxial tracks of transparent and opaque sectors, the first of said tracks having at least one opaque sector, and at least one transparent sector, the sectors of said first track being of equal length and each of the transparent sectors of the other tracks of the disc terminating on radii of this disc forming a plurality of radial sectors of the disc, said disc having four quadrants and in each quadrant each radial sector containing a unique combination of transparent and opaque sectors of the other tracks, one end of each transparent sector of the first of said tracks being on a radius of the disc bisecting one of the radial sectors of the disc, and the radial sectors of the disc increasing in width in accordance with a trigonometric function on both sides of the bisector line commencing with the radial sector adjacent to said bisected sector, each half of said bisected sector having a width substantially equal to the width of the adjacent radial sectors, periodically generating one of two electrical signals for each track of the code disk, the first signal representing a transparent sector confronting a selected radial readout line and the second signal representing an opaque sector confronting said radial readout line, whereby the first electrical signals of the first track represent a positive number and the second electrical signals of the first track represent a negative number, and the first electrical signals of the other tracks represent the binary "1" and the second signals of the other tracks represent the binary "0," and the signals of the other tracks represent a binary number, and adding a binary "½" from the binary number represented by the other tracks to give a digital number representing the trigonometric function of the analog information.

7. A code member adapted for photoelectric readout for encoding analog information into digital non-linear functions comprising a disk adapted to rotate about its axis having a plurality of coaxial tracks of transparent and opaque sectors, the first of said tracks having at least one transparent sector and at least one opaque sector, said first track being adapted to determine the sign of the digitally encoded output from the disk, each of the transparent sectors of the outer tracks of the disk terminating on radii of the disk forming a plurality of radial sectors of the disk, one end of each transparent sector of the first of said tracks being on a radius of the disk bisecting one of the radial sectors of the disk, and the radial sectors of the disk changing in width in accordance with said non-linear function on both sides of the bisector line commencing with the radial sector adjacent to said bisected sector, each half of said bisected sector having a width substantially equal to the width of the adjacent radial sectors.

8. The method of encoding analog information into digital values corresponding to the trigonometric function of the analog information comprising the steps of driving a code disc with the analog information to rotate the disc about its axis, said disc having a plurality of coaxial tracks of transparent and opaque sectors, the first of said tracks having at least one transparent sector and at least one opaque sector, each of the transparent sectors of the other tracks of the disc terminating on a radii of the disc forming a plurality of radial sectors of the disc, one end of each transparent sector of the first of said tracks being on a radius of the disc bisecting one of the radial sectors of the disc, and the radial sectors of the disc changing in length in accordance with a non-linear function on both sides of the bisector line commencing with the radial sector adjacent to said bisector, each half of said bisected sector having a width substantially equal to the width of the adjacent radial sectors, periodically generating one of two electrical signals for each track of the code disk, the first signal representing a transparent sector confronting a selected radial readout line and the second signal representing an opaque sector confronting said radial readout line, whereby the first electrical signals of the first track represent a positive number and the second electrical signals of the first track represent a negative number, and the first electrical signals of the other tracks represent the binary "1" and the second signals of the other tracks represent the binary "0," and the signals of the other tracks represent a binary number, and adding a binary "½" from the binary number represented by the other tracks to give a digital number representing the non-linear function of the analog information.

References Cited

UNITED STATES PATENTS

| | | | |
|---|---|---|---|
| 2,436,178 | 2/1948 | Rauchman | 340—347.3 |
| 2,907,996 | 10/1959 | Schmidt | 340—347.3 |

OTHER REFERENCES

Instruments and Automation, vol. 29, issue 6, June 1956 (pp. 1109–1117, pp. 1113 is relied upon).

MAYNARD R. WILBUR, *Primary Examiner.*

GARY R. EDWARDS, *Assistant Examiner.*

UNITED STATES PATENT OFFICE

CERTIFICATE OF CORRECTION

Patent No. 3,425,052 January 28, 1969

Edward M. Jones

It is certified that error appears in the above identified patent and that said Letters Patent are hereby corrected as shown below:

Column 2, line 63, "sene" should read -- seen --. Column 3, line 56, beginning with "FIGURE 5" cancel all to and including "FIGURE 4B." same column 3, line 68. Column 5, line 34, "determined" should read -- determine --. Column 6, line 19, "outer" should read -- other --.

Signed and sealed this 14th day of April 1970.

(SEAL)
Attest:

Edward M. Fletcher, Jr.
Attesting Officer

WILLIAM E. SCHUYLER, JR.
Commissioner of Patents